US012749852B2

(12) United States Patent
Mukasa et al.

(10) Patent No.: US 12,749,852 B2
(45) Date of Patent: Sep. 29, 2026

(54) CONNECTION STRUCTURE OF WIRING MATERIALS

(71) Applicant: YAZAKI CORPORATION, Tokyo (JP)

(72) Inventors: Hirotaka Mukasa, Makinohara (JP); Yoshiki Aoshima, Makinohara (JP); Hirokuni Koike, Makinohara (JP)

(73) Assignee: YAZAKI CORPORATION, Tokyo (JP)

(*) Notice: Subject to any disclaimer, the term of this patent is extended or adjusted under 35 U.S.C. 154(b) by 377 days.

(21) Appl. No.: 18/639,953

(22) Filed: Apr. 18, 2024

(65) Prior Publication Data

US 2024/0266783 A1 Aug. 8, 2024

Related U.S. Application Data

(63) Continuation of application No. PCT/JP2023/003315, filed on Feb. 2, 2023.

(30) Foreign Application Priority Data

Feb. 16, 2022 (JP) ................................ 2022-022103

(51) Int. Cl.

*H01R 13/642* (2006.01)
*H01R 4/30* (2006.01)
*H01R 13/502* (2006.01)
*H01R 13/621* (2006.01)

(52) U.S. Cl.

CPC ............. *H01R 13/642* (2013.01); *H01R 4/30* (2013.01); *H01R 13/502* (2013.01); *H01R 13/621* (2013.01)

(58) Field of Classification Search

CPC .. H01R 13/642; H01R 13/621; H01R 13/502; H01R 4/30

See application file for complete search history.

(56) References Cited

U.S. PATENT DOCUMENTS

| | | | | |
|---|---|---|---|---|
| 5,730,619 A * | 3/1998 | Hamlin | H01R 13/193 439/573 |
| 8,529,277 B2 * | 9/2013 | Williams | H01R 13/5208 439/655 |
| 9,190,791 B1 * | 11/2015 | Jaena | H01R 25/162 |
| 10,971,873 B2 * | 4/2021 | Rai | H01H 50/12 |

(Continued)

FOREIGN PATENT DOCUMENTS

JP 2019-9115 A 1/2019

*Primary Examiner* — Harshad C Patel
(74) *Attorney, Agent, or Firm* — KENEALY VAIDYA LLP

(57) ABSTRACT

In a first wiring material and a second wiring material of a connection structure of wiring materials, in a fastened state in which a shaft part of a fastening member is inserted through a first through hole for fastening and a second through hole for fastening and a second electric conductor is fastened to a first electric conductor by the fastening member, a first finger touch prevention part is inserted through a through hole for a second finger touch prevention part, a second finger touch prevention part is inserted through a through hole for the first finger touch prevention part, and a first connection surface and a second connection surface are brought into contact with each other in a plate thickness direction to be electrically connected.

3 Claims, 10 Drawing Sheets

(56) References Cited

U.S. PATENT DOCUMENTS

| | | | | |
|---|---|---|---|---|
| 11,699,887 | B2 * | 7/2023 | Jin | H01R 25/162 439/214 |
| 11,705,660 | B2 * | 7/2023 | Reichel | H01R 13/64 439/131 |
| 11,824,284 | B2 * | 11/2023 | Yamamoto | B60R 16/0215 |
| 12,355,199 | B2 * | 7/2025 | Hirano | H01R 4/70 |
| 12,368,272 | B2 * | 7/2025 | Schneider | H01R 4/48 |
| 12,424,780 | B2 * | 9/2025 | Peterson | H01R 13/5221 |
| 12,424,806 | B2 * | 9/2025 | Ellensohn | H01R 4/34 |
| 2018/0375227 | A1 * | 12/2018 | Kaehny | H01M 50/543 |
| 2020/0411831 | A1 * | 12/2020 | Kim | H01M 50/51 |

* cited by examiner

CONNECTION STRUCTURE OF WIRING MATERIALS

CROSS-REFERENCE TO RELATED APPLICATION(S)

This application is a continuation application of International Application No. PCT/JP2023/003315 filed on Feb. 2, 2023 which claims the benefit of priority from Japanese Patent Application No. 2022-022103 filed on Feb. 16, 2022 and designating the U.S., the entire contents of which are incorporated herein by reference.

BACKGROUND OF THE INVENTION

1. Field of the Invention

The present invention relates to a connection structure of wiring materials.

2. Description of the Related Art

Conventionally, in a vehicle such as an electric vehicle and a hybrid vehicle, for example, a high-voltage battery is electrically and physically connected to a motor as a driving source via a plurality of wiring materials. For example, the wiring materials are connected by fastening end parts of electric conductors constituting the wiring materials using fastening members such as a bolt and a nut (for example, refer to Patent Literature 1). In Japanese Patent Application Laid-open No. 2019-9115, the wiring materials and the fastening members are housed in an insulating resin case and the like to prevent an operator from getting an electric shock at the time of assembling work or vehicle maintenance, so that safety during the work is secured.

However, in Japanese Patent Application Laid-open No. 2019-9115, two electric conductors are not in direct contact with each other, but are connected via a current bridge, so that there is room for improvement in view of an increase in connection resistance and the like.

SUMMARY OF THE INVENTION

The present invention aims at providing a connection structure of wiring materials that can secure a proper energized state between wiring materials while securing safety of an operator.

In order to achieve the above mentioned object, a connection structure of wiring materials according to one aspect of the present invention includes a first wiring material including a first electric conductor having electrical conductivity, and a first housing member having an insulation property and configured to house the first electric conductor inside; a second wiring material including a second electric conductor having electrical conductivity, and a second housing member having an insulation property and configured to house the second electric conductor inside; and a fastening member configured to fasten the first electric conductor and the second electric conductor to be electrically connected with each other, wherein the first electric conductor includes: a first main body part formed in a belt shape; and a first connection part formed at at least one end part in an extending direction of the first main body part, the second electric conductor includes: a second main body part formed in a belt shape; and a second connection part formed at at least one end part in an extending direction of the second main body part, the first housing member includes: a first main body housing part configured to house the first main body part; and a first connection housing part configured to be coupled to the first main body housing part and house the first connection part, the second housing member includes: a second main body housing part configured to house the second main body part; and a second connection housing part configured to be coupled to the second main body housing part and house the second connection part, the first connection housing part includes: a first opening part configured to expose part of the first connection part housed inside to the outside; and a first finger touch prevention part positioned to be overlapped with at least the first opening part, and formed to prevent finger touch with the first connection part housed inside, the second connection housing part includes: a second opening part configured to expose part of the second connection part housed inside to the outside; and a second finger touch prevention part positioned to be overlapped with at least the second opening part, and formed to prevent finger touch with the second connection part housed inside, the first connection part includes: a first connection surface that is exposed to the outside via the first opening part, and opposed to a connection surface of the second connection part in a plate thickness direction of the first electric conductor; a first through hole for fastening passing through the first connection surface toward a back surface in the plate thickness direction, through which a shaft part of the fastening member is inserted; and a through hole for the first finger touch prevention part that is disposed at a position different from a position of the first through hole for fastening, and passes through the first connection surface toward a back surface in the plate thickness direction, the second connection part includes: a second connection surface that is exposed to the outside via the second opening part, and opposed to the first connection surface in a plate thickness direction of the second electric conductor; a second through hole for fastening passing through the second connection surface toward a back surface in the plate thickness direction, through which the shaft part of the fastening member is inserted; and a through hole for the second finger touch prevention part that is disposed at a position different from a position of the second through hole for fastening, and passes through the second connection surface toward a back surface in the plate thickness direction, and in the first wiring material and the second wiring material, in a fastened state in which the shaft part of the fastening member is inserted through the first through hole for fastening and the second through hole for fastening, and the second electric conductor is fastened to the first electric conductor by the fastening member, the first finger touch prevention part is inserted through the through hole for the second finger touch prevention part and the second finger touch prevention part is inserted through the through hole for the first finger touch prevention part, and the first connection surface and the second connection surface are brought into contact with each other in the plate thickness direction to be electrically connected.

The above and other objects, features, advantages and technical and industrial significance of this invention will be better understood by reading the following detailed description of presently preferred embodiments of the invention, when considered in connection with the accompanying drawings.

DETAILED DESCRIPTION OF THE PREFERRED EMBODIMENTS

Figure 1:
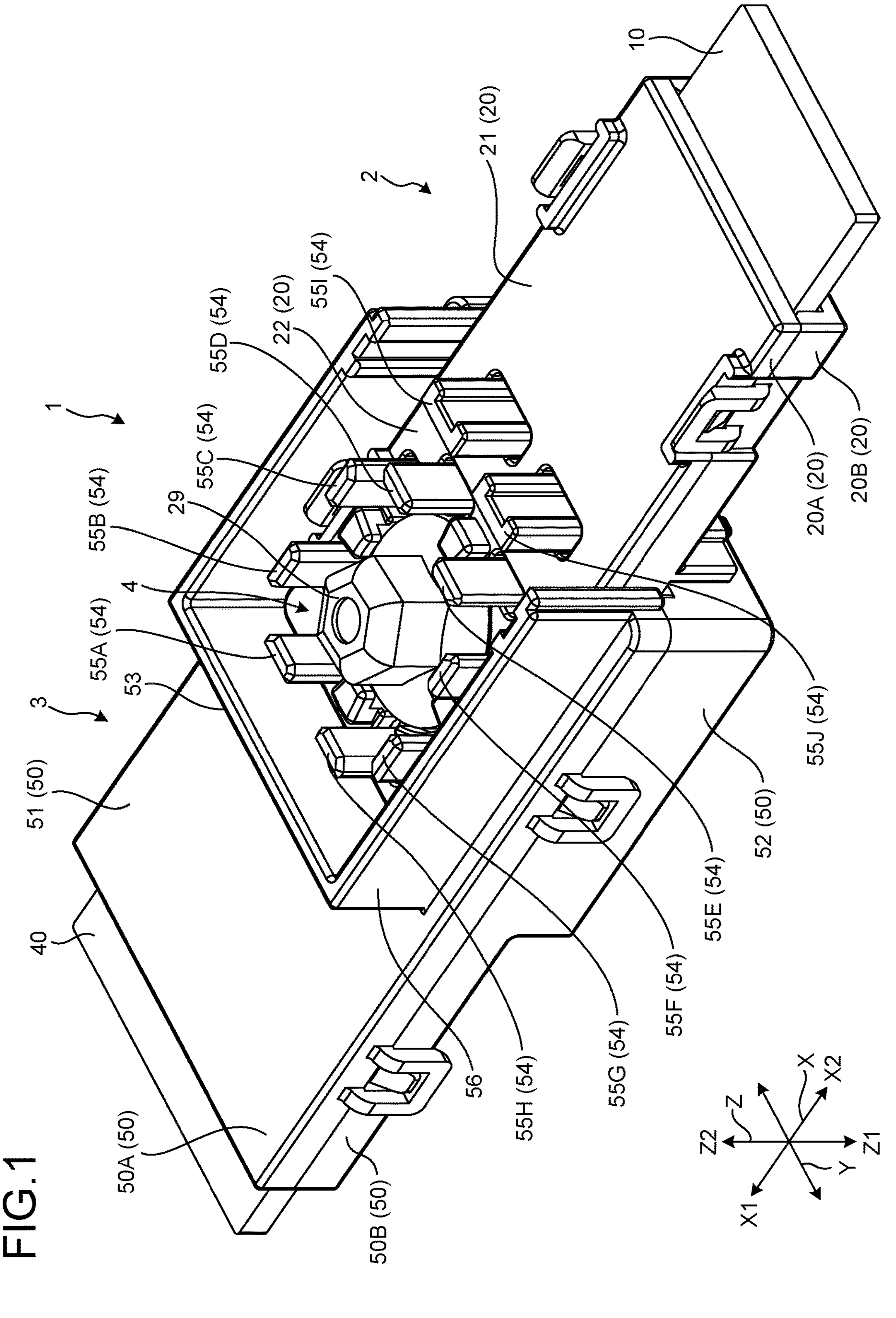
FIG. 1 is a perspective view illustrating a schematic configuration of a connection structure of wiring materials according to an embodiment.

The following describes an embodiment of a connection structure of wiring materials according to the present invention in detail with reference to the drawings. The present invention is not limited to the embodiment described below. That is, constituent elements in the embodiment described below include a constituent element that is easily conceivable by those skilled in the art or substantially the same constituent element, and the constituent elements can be variously omitted, replaced, and modified without departing from the gist of the invention.

Embodiment

The following describes a connection structure of wiring materials according to the present embodiment with reference to FIG. 1 to FIG. 10. A connection structure 1 of wiring materials (a first wiring material 2 and a second wiring material 3 described later) connects a plurality of wiring materials that are mounted on a vehicle such as an electric vehicle and a hybrid vehicle, and electrically and physically connect a high-voltage battery and a motor as a driving source, or connect connection objects in a battery pack. The connection structure 1 of the wiring materials includes the first wiring material 2, the second wiring material 3, and a fastening member 4. The first wiring material 2 is, for example, connected to a battery side in a case of being wired in the vehicle. On the other hand, the second wiring material 3 is connected to a motor side in a case of being wired in the vehicle. The fastening member 4 fastens the first wiring material 2 and the second wiring material 3 to be electrically connected to each other.

In the following description, an X-direction illustrated in the drawings is assumed to be, for convenience's sake, an extending direction of each of the first wiring material 2 and the second wiring material 3 in the present embodiment. A Y-direction illustrated in the drawings is assumed to be, for convenience's sake, a width direction of each of the first wiring material 2 and the second wiring material 3 in the present embodiment, and a direction orthogonal to the extending direction. A Z-direction illustrated in the drawings is assumed to be, for convenience's sake, a plate thickness direction of each of the first wiring material 2 and the second wiring material 3 in the present embodiment, and a direction orthogonal to the extending direction and the width direction. Particularly, in the X-direction, an X1-direction is assumed to be a first extending direction, and X2 is assumed to be a second extending direction. In the Z-direction, a Z1-direction is assumed to be a mounting direction, and a Z2-direction is assumed to be a removal direction. In the following description, unless otherwise specified, the directions are described assuming that the first wiring material 2 and the second wiring material 3 are connected in a proper positional relation and mounted on a vehicle. The directions described above are respectively referred to as an "extending direction X", a "first extending direction X1", a "second extending direction X2", a "width direction Y", a "plate thickness direction Z", a "mounting direction Z1", and a "removal direction Z2".

Figure 2:
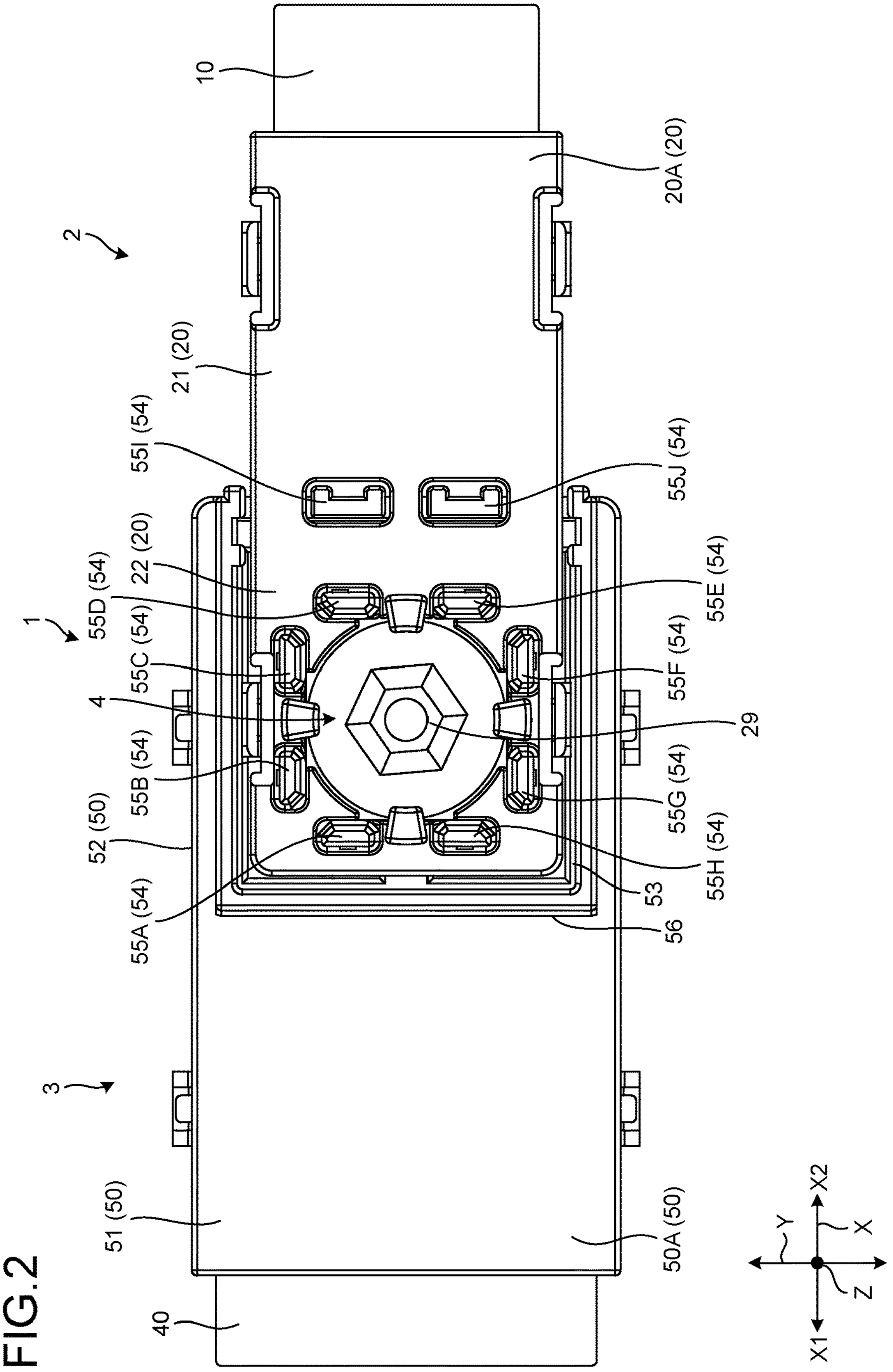
FIG. 2 is a plan view illustrating a schematic configuration of the connection structure of wiring materials according to the embodiment.
Figure 3:
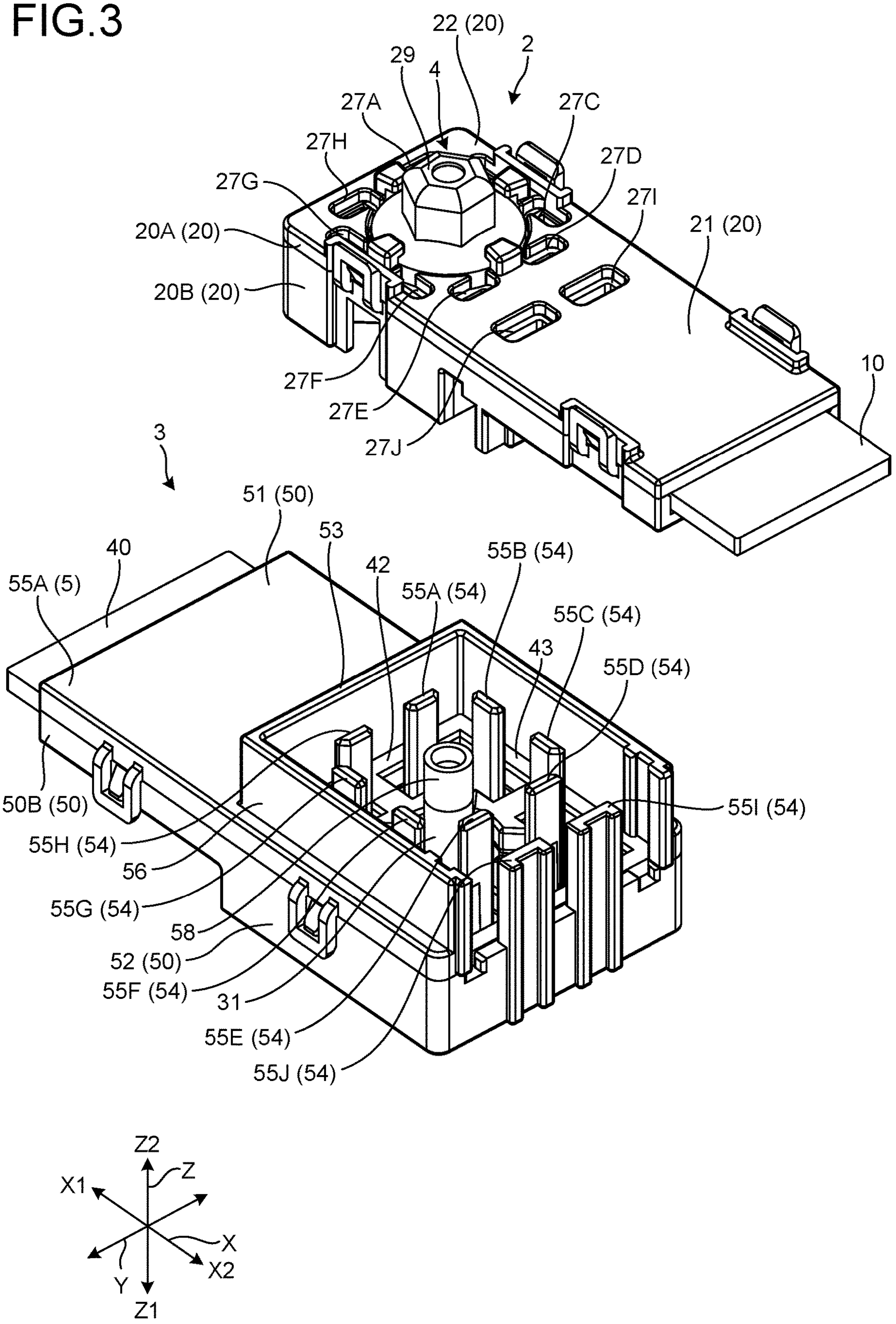
FIG. 3 is a perspective view illustrating a schematic configuration of a first wiring material and a second wiring material according to the embodiment.

As illustrated in FIG. 1 to FIG. 3, the first wiring material 2 includes a first electric conductor 10 and a first housing member 20. The first electric conductor 10 is formed in a rectangular flat plate shape with a metallic material and the like having electrical conductivity. The first electric conductor 10 includes a first main body part 11 extending in the extending direction X and formed in a belt shape, and a first connection part 12.

Figure 4:
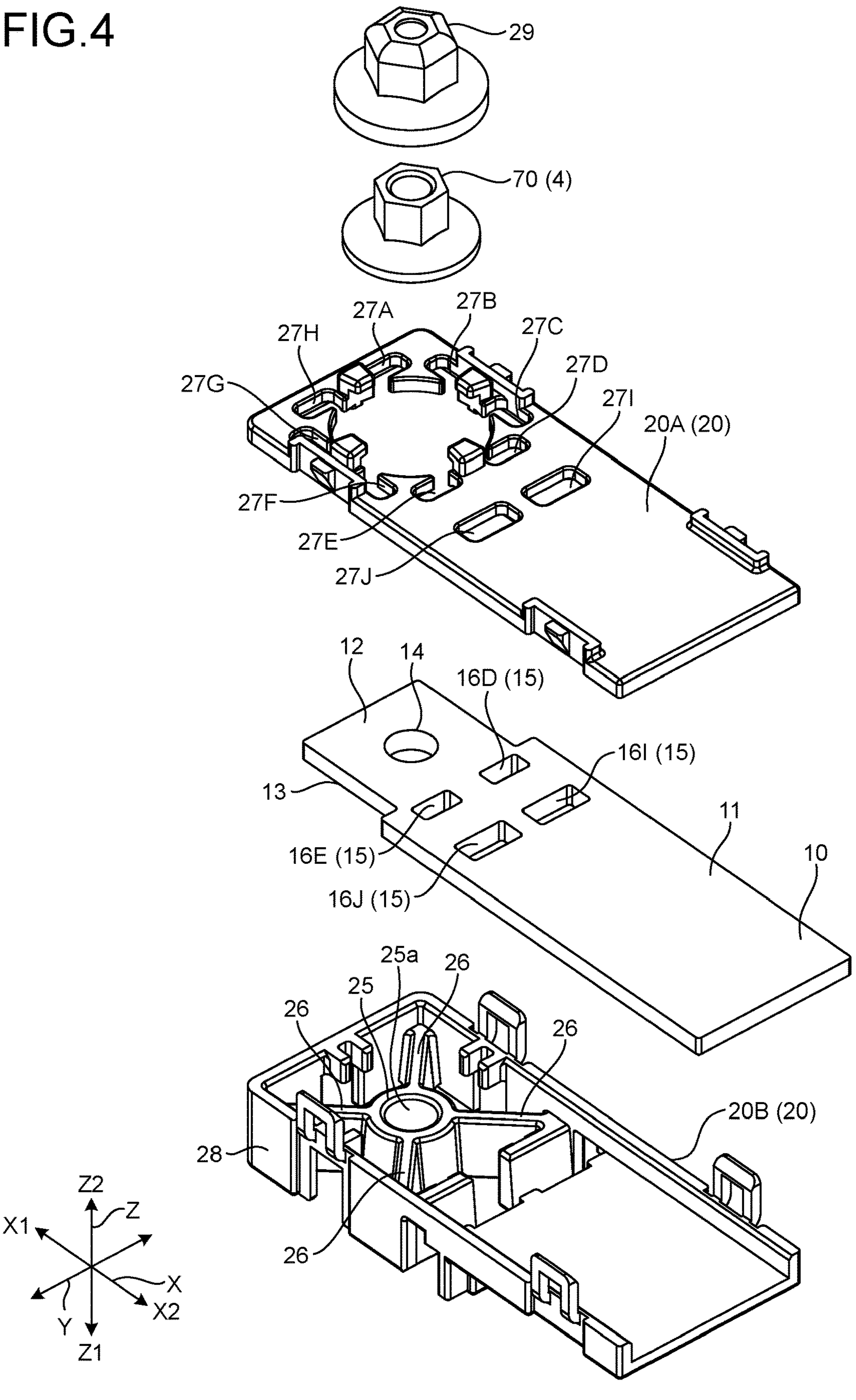
FIG. 4 is an exploded perspective view illustrating a schematic configuration of the first wiring material according to the embodiment.

The first connection part 12 is formed at at least one of end parts in the extending direction X of the first main body part 11. Part of the first connection part 12 is exposed to the outside of the first wiring material 2, and connected to a connection part (second connection part 42) of the second wiring material 3. As illustrated in FIG. 4, when viewed from the plate thickness direction Z, a width (length) in the width direction Y of the first connection part 12 on a side of one end part of the extending direction X (first extending direction X1) is smaller (shorter) than the width in the width direction Y thereof on a side of the first main body part 11 on the other side of the extending direction X (second extending direction X2). The first connection part 12 includes a first connection surface 13, a first through hole 14 for fastening, and a through hole 15 for a first finger touch prevention part.

The first connection surface 13 is exposed to the outside via a first opening part 23 of the first housing member 20 (described later), and opposed to a second connection surface 43 of the second connection part 42 in the plate thickness direction Z of the first electric conductor 10. The first connection surface 13 is formed on one side of the plate thickness direction Z (mounting direction Z1) of the first connection part 12.

The first through hole 14 for fastening passes through the first connection surface 13 toward a back surface in the plate thickness direction Z, and a shaft part 31 of the fastening member 4 is inserted therethrough. The first through hole 14 for fastening is formed in a circular shape when viewed from the plate thickness direction Z.

The through hole 15 for a first finger touch prevention part is disposed at a position different from that of the first through hole 14 for fastening, and passes through the first connection surface 13 toward the back surface in the plate thickness direction Z. The through hole 15 for a first finger touch prevention part is constituted of four first electric conductor through holes 16D, 16E, 16I, and 16J. Each of the first electric conductor through holes 16D, 16E, 16I, and 16J is formed in a substantially rectangular shape (or a substantially oblong shape) when viewed from the plate thickness direction Z. The first electric conductor through holes 16D, 16E, 16I, and 16J are disposed on the first main body part 11 side with respect to the first through hole 14 for fastening, and formed at intervals in the extending direction X and the width direction Y.

Figure 5:
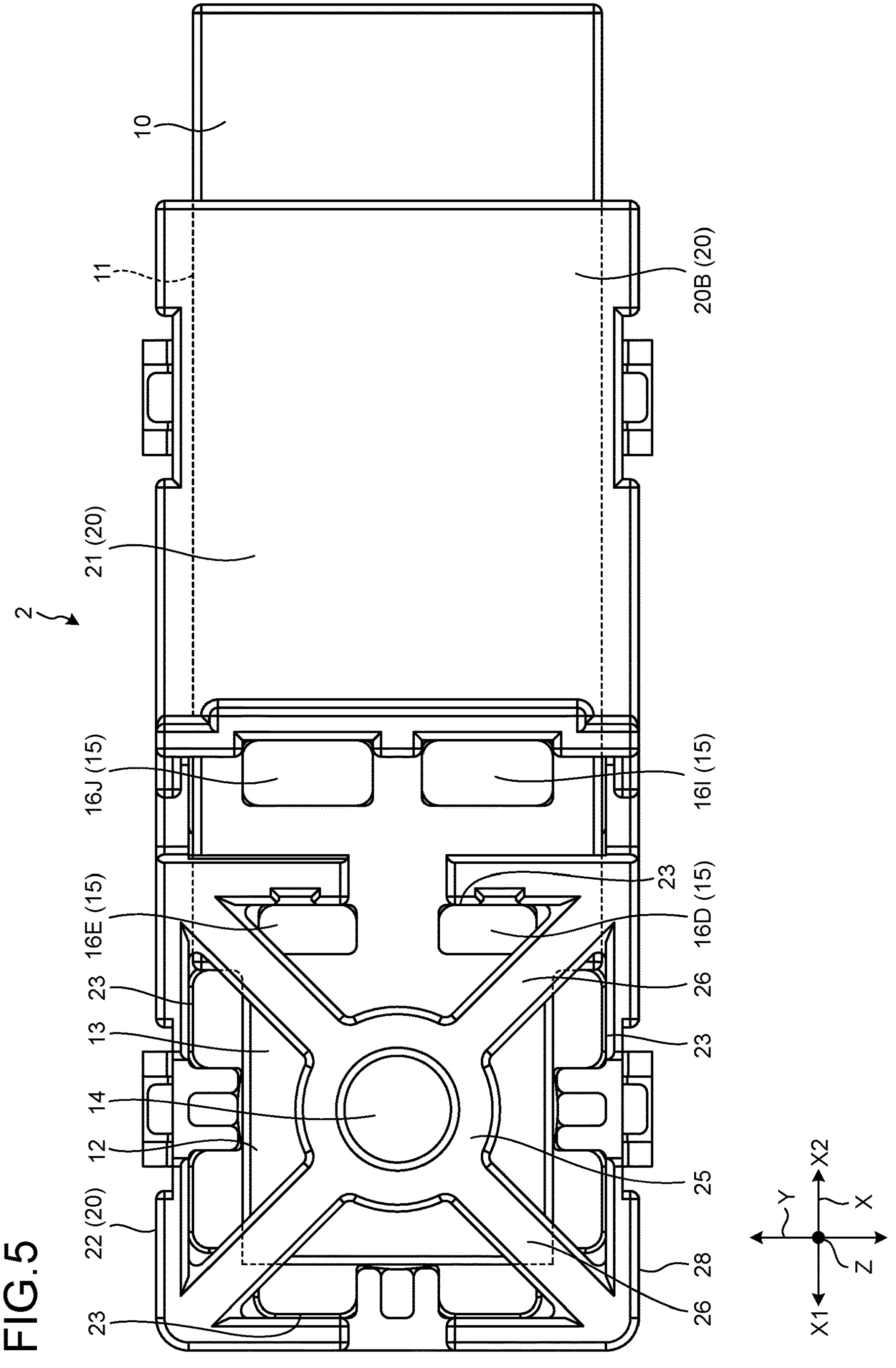
FIG. 5 is a plan view illustrating a schematic configuration of the first wiring material according to the embodiment.
Figure 6:
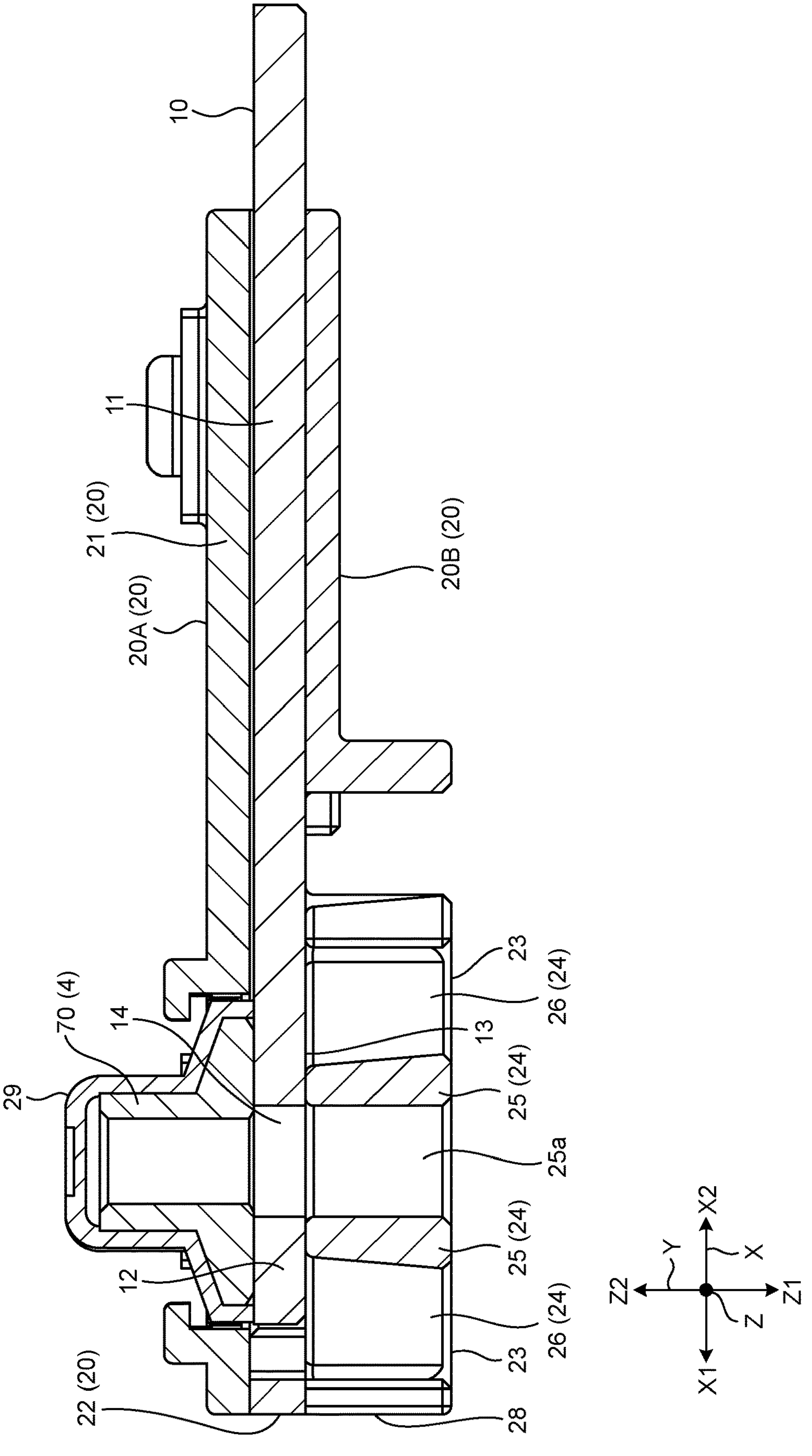
FIG. 6 is a cross-sectional view illustrating a schematic configuration of the first wiring material according to the embodiment.

The first housing member 20 is formed in a rectangular housing shape using a synthetic resin material and the like having an insulation property, and houses the first electric conductor 10 therein. As illustrated in FIG. 5 and FIG. 6, for convenience' sake, the first housing member 20 is constituted of an upper case 20A and a lower case 20B, and houses the first electric conductor 10 therein. The upper case 20A and the lower case 20B are locked to each other by a locking mechanism. The first housing member 20 includes a first main body housing part 21 and a first connection housing part 22.

The first main body housing part 21 houses the first main body part 11 of the first electric conductor 10. The first main body housing part 21 covers an outer surface of the first main body part 11 by the upper case 20A and the lower case 20B in a state of housing the first main body part 11 therein.

The first connection housing part 22 houses the first connection part 12 of the first electric conductor 10. The first connection housing part 22 includes the first opening part 23, a first finger touch prevention part 24, a plurality of first through holes 27A to 27J, and a first housing wall part 28.

The first opening part 23 exposes part of the first connection part 12 housed inside to the outside. As illustrated in FIG. 5 and FIG. 6, the first opening part 23 is disposed on the lower case 20B, and opens toward one side of the plate thickness direction Z (mounting direction Z1).

The first finger touch prevention part 24 is positioned to be overlapped with at least the first opening part 23, and formed to prevent finger touch with the first connection part 12 housed inside. The first finger touch prevention part 24 according to the present embodiment includes a cylindrical part 25 and coupling parts 26.

The cylindrical part 25 is formed in a cylindrical shape, and positioned on an inner side of a through hole 45 for a second finger touch prevention part (described later) in a fastened state in which the first wiring material 2 and the second wiring material 3 are fastened by the fastening member 4. The shaft part 31 of the fastening member 4 is inserted on an inner peripheral side thereof. The cylindrical part 25 includes an internal space 25*a*. The internal space 25*a* communicates with the outside via openings at both ends in the plate thickness direction Z of the lower case 20B as a single item. In a state in which the first electric conductor 10 is assembled to the lower case 20B, an open end on one side of the plate thickness direction Z (removal direction Z2) of the cylindrical part 25 is opposed to an open end on the other side of the plate thickness direction Z (mounting direction Z1) of the first through hole 14 for fastening.

The coupling parts 26 each couple part of an outer peripheral surface of the cylindrical part 25 with the first housing wall part 28. The coupling parts 26 radially extend from the cylindrical part 25 as the center to be coupled with an inner peripheral surface of the first housing wall part 28. The coupling parts 26 are formed in a substantially X-shape when viewed from the plate thickness direction Z. The cylindrical part 25, the coupling parts 26, and the first housing wall part 28 form the first opening part 23. That is, the first finger touch prevention part 24 defines a size and a shape of the first opening part 23 together with the first housing wall part 28, and prevents finger touch of an operator with the first connection part 12. As illustrated in FIG. 5, the coupling parts 26 are formed at positions not to be opposed to the first through hole 14 for fastening and the through hole 15 for the first finger touch prevention part in the plate thickness direction Z. In the first finger touch prevention part 24, the cylindrical part 25 and the coupling parts 26 are disposed so that intervals among the cylindrical part 25 and the coupling parts 26 are intervals with which a finger does not reach the first connection part 12 via gaps among the cylindrical part 25 and the coupling parts 26.

In the fastened state in which the first wiring material 2 and the second wiring material 3 are fastened by the fastening member 4, a second finger touch prevention part 54 (described later) is inserted through the first through holes 27A to 27J. Each of the first through holes 27A to 27J passes through the upper case 20A in the plate thickness direction. When viewed from the plate thickness direction, each of the first through holes 27A to 27J is formed in a substantially rectangular shape corresponding to a shape of each of projecting parts 55A to 55J (described later) viewed from the plate thickness direction.

The first housing wall part 28 is formed in a substantially rectangular shape when viewed from the plate thickness direction Z, and formed to surround the periphery of the cylindrical part 25. The first housing wall part 28 is formed to have the same height (length) in the plate thickness direction Z as the height in the plate thickness direction Z of each of the cylindrical part 25 and the coupling part 26.

As illustrated in FIG. 1 to FIG. 3, the second wiring material 3 includes a second electric conductor 40 and a second housing member 50. The second electric conductor 40 is formed in a rectangular flat plate shape with a metallic material having electrical conductivity similarly to the first electric conductor 10 described above. The second electric conductor 40 includes a second main body part 41 extending in the extending direction X and formed in a belt shape, and the second connection part 42.

Figure 7:
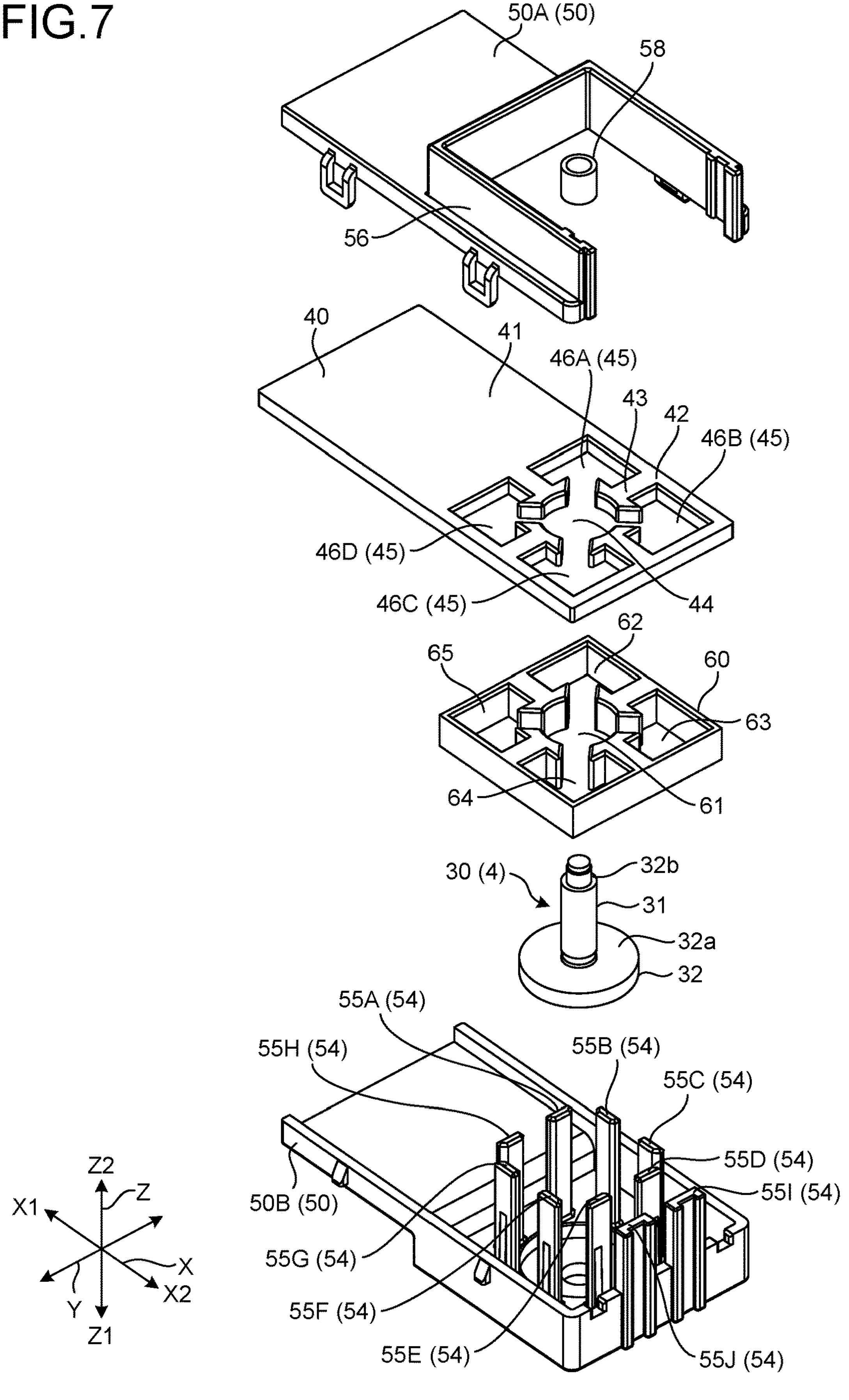
FIG. 7 is an exploded perspective view illustrating a schematic configuration of the second wiring material according to the embodiment.

The second connection part 42 is formed at at least one of end parts in the extending direction X of the second main body part 41. Part of the second connection part 42 is exposed to the outside of the second wiring material 3, and connected to the first connection part 12 of the first wiring material 2. As illustrated in FIG. 7, when viewed from the plate thickness direction Z, a width in the width direction Y of the second connection part 42 on a side of the end part on the other side of the extending direction X (second extending direction X2) is the same as the width in the width direction Y on a side of the second main body part 41 on one side of the extending direction X (first extending direction X1). The second connection part 42 includes the second connection surface 43, a second through hole 44 for fastening, and a through hole 45 for the second finger touch prevention part.

The second connection surface 43 is exposed to the outside via a second opening part 53 of the second housing member 50 (described later), and opposed to the first connection surface 13 of the first connection part 12 in the plate thickness direction Z of the second electric conductor 40. The second connection surface 43 is formed on one side of the plate thickness direction Z (removal direction Z2) of the second connection part 42.

The second through hole 44 for fastening passes through the second connection surface 43 toward a back surface in the plate thickness direction Z, and the shaft part 31 of the fastening member 4 is inserted therethrough. The second through hole 44 for fastening is formed in a substantially circular shape when viewed from the plate thickness direction Z. The second through hole 44 for fastening is formed to partially communicate with the through hole 45 for the second finger touch prevention part.

Figure 8:
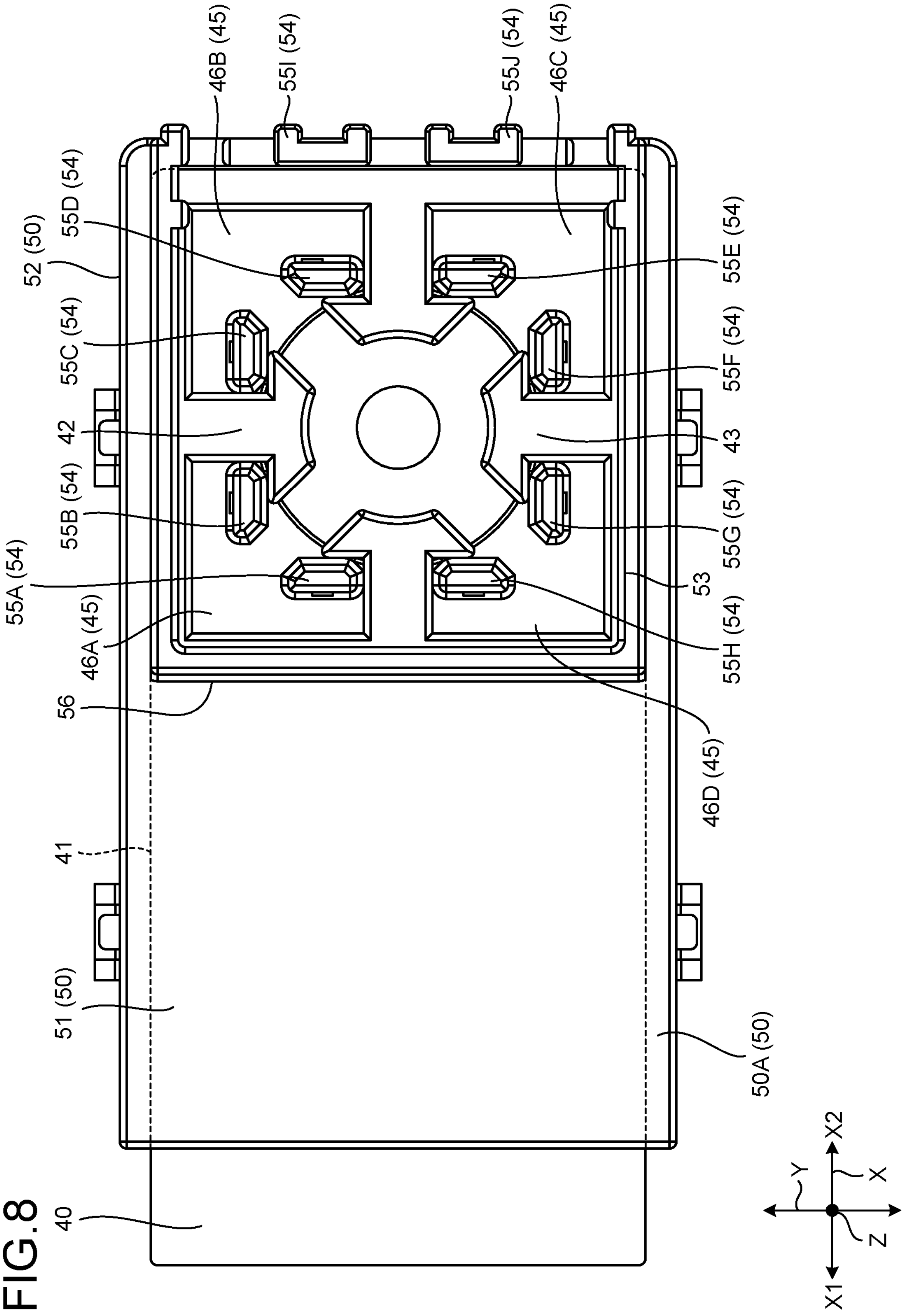
FIG. 8 is a plan view illustrating a schematic configuration of the second wiring material according to the embodiment.

The through hole 45 for the second finger touch prevention part is disposed at a position different from that of the second through hole 44 for fastening, and passes through the second connection surface 43 toward the back surface in the plate thickness direction Z. As illustrated in FIG. 8, in the second wiring material 3, the second finger touch prevention part 54 formed on the second housing member 50 (described later) is inserted through the through hole 45 for the second finger touch prevention part. The through hole 45 for the second finger touch prevention part is constituted of four second electric conductor through holes 46A, 46B, 46C, and 46D. Each of the second electric conductor through holes 46A to D is formed in a substantially L-shape when viewed from the plate thickness direction Z. The second electric conductor through holes 46A to 46D are disposed substantially radially from the second through hole 44 for fastening as the center, and formed at intervals in the extending direction X and the width direction Y.

Figure 9:
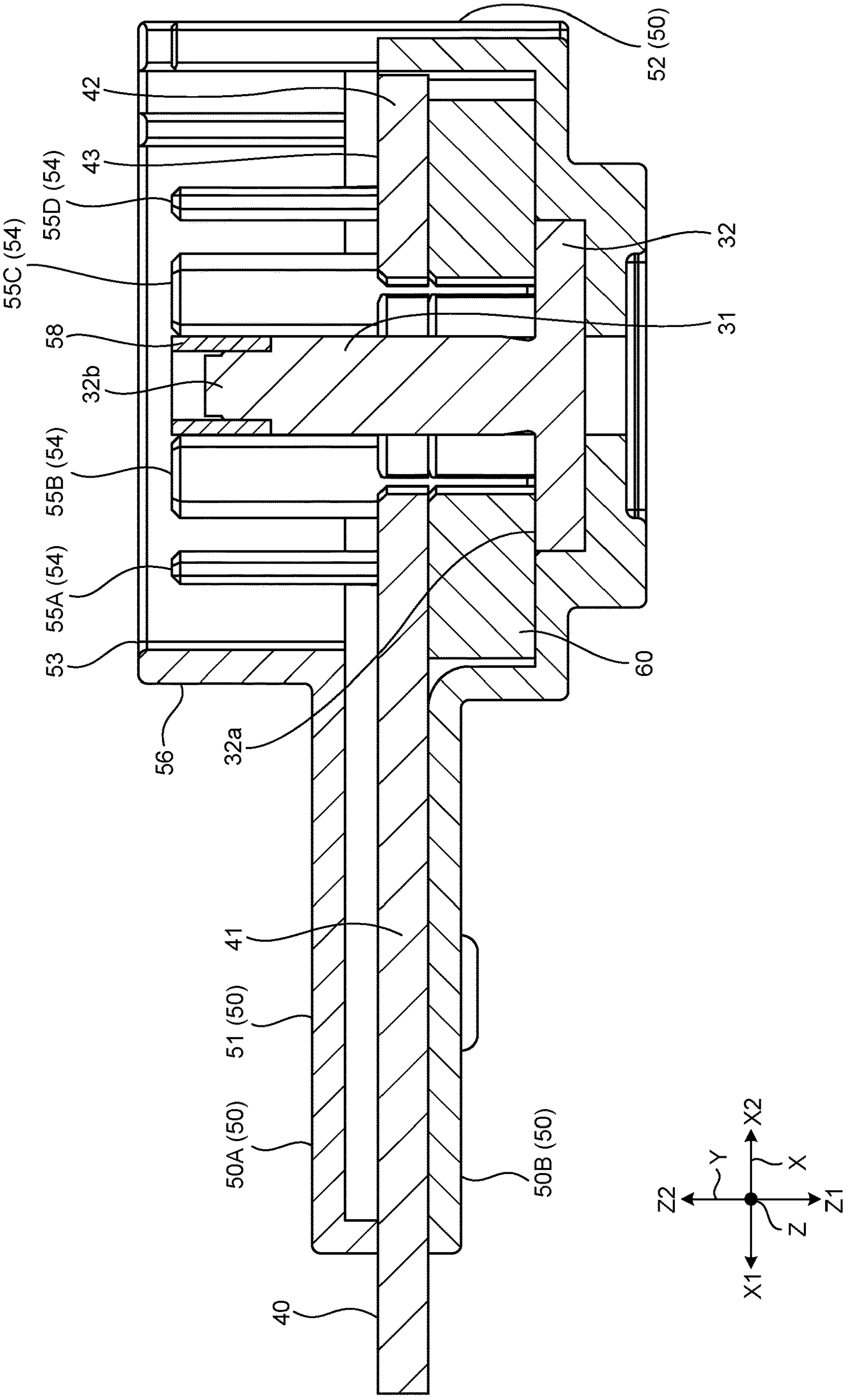
FIG. 9 is a cross-sectional view illustrating a schematic configuration of the second wiring material according to the embodiment.

The second housing member 50 is formed in a rectangular housing shape using a synthetic resin material and the like having an insulation property similarly to the first housing member 20, and houses the second electric conductor 40 therein. As illustrated in FIG. 7 to FIG. 9, for convenience' sake, the second housing member 50 is constituted of an upper case 50A and a lower case 50B, and houses the second electric conductor 40 therein. The upper case 50A and the lower case 50B are locked to each other by a locking mechanism. The second housing member 50 includes a second main body housing part 51 and a second connection housing part 52.

The second main body housing part 51 houses the second main body part 41 of the second electric conductor 40. The second main body housing part 51 covers an outer surface of the second main body part 41 by the upper case 50A and the lower case 50B in a state of housing the second main body part 41 therein.

The second connection housing part 52 houses the second connection part 42 of the second electric conductor 40. The second connection housing part 52 includes the second opening part 53, the second finger touch prevention part 54, and a second housing wall part 56.

The second opening part 53 exposes part of the second connection part 42 housed inside to the outside. As illustrated in FIG. 8 and FIG. 9, the second opening part 53 is disposed on the upper case 50A, and opens toward one side of the plate thickness direction Z (removal direction Z2).

The second finger touch prevention part 54 is positioned to be overlapped with at least the second opening part 53, and formed to prevent finger touch with the second connection part 42 housed inside. The second finger touch prevention part 54 according to the present embodiment is constituted of the projecting parts 55A to 55J. Each of the projecting parts 55A to 55J is formed to project toward one side of the plate thickness direction (removal direction Z2) from the lower case 50B and extend in the plate thickness direction. Each of the projecting parts 55A to 55J is formed in a substantially rectangular shape (or a substantially oblong shape) when viewed from the plate thickness direction Z.

In the second wiring material 3, the projecting part 55A is inserted through the second electric conductor through hole 46A, and formed at a position opposed to the projecting part 55D across the second through hole 44 for fastening in the extending direction X and opposed to the projecting part 55H across part of the second connection part 42 in the width direction Y. In the second wiring material 3, the projecting part 55B is inserted through the second electric conductor through hole 46A, and formed at a position opposed to the projecting part 55C across part of the second connection part 42 in the extending direction X and opposed to the projecting part 55G across the second through hole 44 for fastening in the width direction Y. In the second wiring material 3, the projecting part 55C is inserted through the second electric conductor through hole 46B, and formed at a position opposed to the projecting part 55F across the second through hole 44 for fastening in the width direction Y. In the second wiring material 3, the projecting part 55D is inserted through the second electric conductor through hole 46B, and formed at a position opposed to the projecting part 55E across part of the second connection part 42 in the width direction Y. In the second wiring material 3, the projecting part 55E is inserted through the second electric conductor through hole 46C, and formed at a position opposed to the projecting part 55H across the second through hole 44 for fastening in the extending direction. In the second wiring material 3, the projecting part 55F is inserted through the second electric conductor through hole 46C, and formed at a position opposed to the projecting part 55G across part of the second connection part 42 in the extending direction X. In the second wiring material 3, the projecting part 55G and the projecting part 55H are inserted through the second electric conductor through hole 46D. In the second finger touch prevention part 54, the projecting parts 55A to 55J are disposed so that intervals among the projecting parts 55A to 55J are intervals with which a finger does not reach the second connection part 42 via gaps among the projecting parts 55A to 55J.

The projecting parts 55A to 55J are inserted through the first through holes 27A to 27J disposed on the first housing member 20 via the first opening part 23 in the fastened state in which the first wiring material 2 and the second wiring material 3 are fastened by the fastening member 4. In this state, end parts in the removal direction Z2 of the projecting parts 55A to 55J project from the first housing member 20 to the outside, that is, toward the removal direction Z2 side. In this state, the projecting parts 55D, 55E, 55I, and 55J of the projecting parts 55A to 55J are inserted through the first electric conductor through holes 16D, 16E, 16I, and 16J disposed on the first electric conductor 10, and inserted through the first through holes 27D, 27E, 27I, and 27J. In the fastened state described above, the projecting part 55A is inserted through the first through hole 27A via the first opening part 23. In the fastened state described above, the projecting part 55B is inserted through the first through hole 27B via the first opening part 23. The projecting part 55C is inserted through the first through hole 27C via the first opening part 23. In the fastened state described above, the projecting part 55D is inserted through the first electric conductor through hole 16D and the first through hole 27D via the first opening part 23. In the fastened state described above, the projecting part 55E is inserted through the first electric conductor through hole 16E and the first through hole 27E via the first opening part 23. In the fastened state described above, the projecting part 55F is inserted through the first through hole 27F via the first opening part 23. In the fastened state described above, the projecting part 55G is inserted through the first through hole 27G via the first opening part 23. In the fastened state described above, the projecting part 55H is inserted through the first through hole 27H via the first opening part 23. In the fastened state described above, the projecting part 55I is inserted through the first electric conductor through hole 16I and the first through hole 27I. In the fastened state described above, the projecting part 55J is inserted through the first electric conductor through hole 16J and the first through hole 27J.

The second housing wall part 56 is formed in a substantially rectangular shape when viewed from the plate thickness direction Z, and formed to surround the periphery of the projecting parts 55A to 55H in a state in which the upper case 50A and the lower case 50B are assembled to each other. The second housing wall part 56 lacks a wall part on the second extending direction X2 side and opens to the second extending direction X2 side, but in a state in which the upper case 50A and the lower case 50B are assembled to each other, part of the opening on the second extending direction X2 side is blocked by the projecting parts 55I and 55J. That is, the second finger touch prevention part 54 defines a size and a shape of the second opening part 53 together with the second housing wall part 56, and prevents finger touch of the operator with the second connection part 42.

The fastening member 4 fastens the first electric conductor 10 and the second electric conductor 40 to be electrically connected to each other. The fastening member 4 according to the present embodiment is constituted of a bolt 30 and a nut 70. The bolt 30 includes the shaft part 31 to which the nut 70 is screwed, and a head part 32 formed at an end part on one side (mounting direction Z1) of the fastening direction (plate thickness direction Z). The head part 32 is formed in a circular shape when viewed from the plate thickness direction Z. The head part 32 includes a seat surface 32*a* that is brought into contact with a collar 60 (described later) in an opposed manner in the fastened state in which the first wiring material 2 and the second wiring material 3 are fastened by the fastening member 4. In the bolt 30, a cylindrical bolt cap 58 is mounted on an end part 32*b* on the opposite side of the head part 32 of the shaft part 31. The bolt cap 58 is made of a synthetic resin material and the like having an insulation property similarly to the first housing member 20. The bolt cap 58 is mounted on the end part 32*b* so that the end part 32*b* is inserted therethrough. The bolt cap 58 is formed such that a distal end on the removal direction Z2 side of the end part 32*b* does not project to the outside of the bolt cap 58 in a state in which the bolt cap 58 is mounted on the end part 32*b* of the bolt 30. The head part 32 is covered by part of the lower case 50B. The nut 70 is covered by a nut cap 29 made of a synthetic resin material and the like having an insulation property so that an outer surface of the nut 70 is not exposed to the outside in a state in which the nut 70 is screwed to the bolt 30.

The collar 60 is interposed between the second connection part 42 and the seat surface 32*a* disposed on the shaft part 31 of the fastening member 4 with respect to the fastening direction by the fastening member 4, and abuts on the second connection part 42 and the seat surface 32*a*. The collar 60 is made of a metallic material and the like having electrical conductivity. The collar 60 is formed in a rectangular shape when viewed from the plate thickness direction Z. The collar 60 includes through holes 61 to 65 having the same shapes as those of the second through hole 44 for fastening and the through hole 45 for the second finger touch prevention part disposed on the second connection part 42 when viewed from the plate thickness direction Z.

In the fastened state in which the first wiring material 2 and the second wiring material 3 are fastened by the fastening member 4, the shaft part 31 of the fastening member

4 is inserted through the through hole 61. In the fastened state described above, part of the second finger touch prevention part 54 is inserted into the through holes 62 to 65. In a non-fastened state in which the first wiring material 2 and the second wiring material 3 are not fastened by the fastening member 4, the projecting parts 55A to 55H are inserted through the through holes 62 to 65, respectively. Each of the through holes 61 to 65 is formed at a position opposed to the through hole 45 for the second finger touch prevention part in the plate thickness direction Z in the non-fastened state. The through hole 61 communicates with the second through hole 44 for fastening in the plate thickness direction Z in the non-fastened state. The through hole 62 communicates with the second electric conductor through hole 46A in the plate thickness direction Z. The through hole 63 communicates with the second electric conductor through hole 46B in the plate thickness direction Z. The through hole 64 communicates with the second electric conductor through hole 46C in the plate thickness direction Z. The through hole 65 communicates with the second electric conductor through hole 46D in the plate thickness direction Z. The projecting parts 55I and 55J are inserted through none of the through holes 61 to 65 and the second electric conductor through holes 46A to 46D in the second wiring material 3 in the non-fastened state described above, and inserted through the first electric conductor through holes 16I and 16J and the first through holes 27I and 27J in the fastened state described above.

Next, the following describes assembly of the connection structure 1 of the first wiring material 2 and the second wiring material 3 configured as described above with reference to FIG. 10.

In the first wiring material 2, the first electric conductor 10 is housed in the first housing member 20 having an insulation property. In the second wiring material 3, the second electric conductor 40 is housed in the second housing member 50 having an insulation property. Due to this, with the first wiring material 2 and the second wiring material 3, even if the first electric conductor 10 and the second electric conductor 40 are in an energized state, a finger of the operator cannot be brought into direct contact with the first electric conductor 10 and the second electric conductor 40, so that an electric shock and the like can be prevented and safety of the operator can be secured.

In the first wiring material 2, the nut cap 29 has a regular hexagonal portion, and the nut 70 to which the nut cap 29 is attached is locked to the first housing member 20 by a locking mechanism to be rotatable about the plate thickness direction Z as an axial direction. Due to this, with the connection structure 1 of the first wiring material 2 and the second wiring material 3, fastening work with a tool such as a spanner or a hexagonal wrench can be easily performed. In the first wiring material 2, the through hole 15 for the first finger touch prevention part, that is, the first through holes 27A to 27H are disposed on the periphery to surround the first through hole 14 for fastening, and formed at positions not to hinder the rotation of the nut cap 29 in the axial direction. Due to this, the connection structure 1 of the first wiring material 2 and the second wiring material 3 can suppress upsizing without deteriorating assembling workability.

In the second wiring material 3, the collar 60 and the bolt 30 are housed inside the second housing member 50 in a state in which the shaft part 31 of the bolt 30 is inserted through the through hole 61 of the collar 60, and the shaft part 31 of the bolt 30 is exposed to the outside via the second opening part 53. Due to this, with the connection structure 1 of the first wiring material 2 and the second wiring material 3, the nut 70 can be easily screwed to the shaft part 31 of the bolt 30, and workability can be improved.

In the first wiring material 2 and the second wiring material 3, the first electric conductor 10 and the second electric conductor 40 are respectively housed inside two divided cases (the upper cases 20A and 50A, and the lower cases 20B and 50B), and the two divided cases are locked to each other by the simple locking mechanism. Due to this, an assembling property of the first housing member 20 and the second housing member 50 with respect to the first electric conductor 10 and the second electric conductor 40 can be facilitated, and assembling workability can be improved.

In the first connection housing part 22 of the first wiring material 2, the first finger touch prevention part 24 is formed to be overlapped with the first opening part 23 in the plate thickness direction Z on the first connection surface 13 of the first connection part 12 exposed to the outside. Due to this, the first opening part 23 is narrowed while securing a contacting portion with the first connection surface 13 and the second connection surface 43, so that the finger of the operator cannot be inserted toward the first connection surface 13 via the first opening part 23 from one side of the plate thickness direction Z (mounting direction Z1), and the finger of the operator can be prevented from being brought into direct contact with the first connection surface 13.

The first housing wall part 28 is formed to surround the first opening part 23 including the first finger touch prevention part 24, so that the finger of the operator cannot be inserted toward the first connection surface 13 from the width direction Y and the extending direction X, and the finger of the operator can be prevented from being brought into direct contact with the first connection surface 13. The first finger touch prevention part 24 and the first housing wall part 28 have a fixed height (length) in the plate thickness direction Z, so that it is possible to separate the first connection surface 13 from a position of the finger of the operator to prevent the finger of the operator from being brought into direct contact with the first connection surface 13.

The nut 70 is covered by the nut cap 29, the outer surface of which has an insulation property. Due to this, it is possible to prevent the finger of the operator from being brought into direct contact with the nut 70 being in contact with the first electric conductor 10 in the energized state.

In the second connection housing part 52 of the second wiring material 3, the second finger touch prevention part 54 is formed to be overlapped with the second opening part 53 in the plate thickness direction Z on the second connection surface 43 of the second connection part 42 exposed to the outside. Due to this, the second opening part 53 is narrowed while securing a contacting portion with the second connection surface 43 and the first connection surface 13, so that the finger of the operator cannot be inserted toward the second connection surface 43 via the second opening part 53 from the other side of the plate thickness direction Z (removal direction Z2), and the finger of the operator can be prevented from being brought into direct contact with the second connection surface 43.

The second housing wall part 56 is formed to surround the second opening part 53 including the second finger touch prevention part 54, so that the finger of the operator cannot be inserted toward the second connection surface 43 from the width direction Y and the extending direction X, and the finger of the operator can be prevented from being brought into direct contact with the second connection surface 43. The second finger touch prevention part 54 and the second housing wall part 56 have a fixed height (length) in the plate thickness direction Z, so that it is possible to separate the second connection surface 43 from the position of the finger of the operator to prevent the finger of the operator from being brought into direct contact with the second connection surface 43.

In the bolt 30, the head part 32 is covered by the lower case 50B, and the end part 32*b* is covered by the bolt cap 58. Due to this, it is possible to prevent the finger of the operator from being brought into direct contact with the bolt 30 being in contact with the second electric conductor 40 in the energized state.

Figure 10:
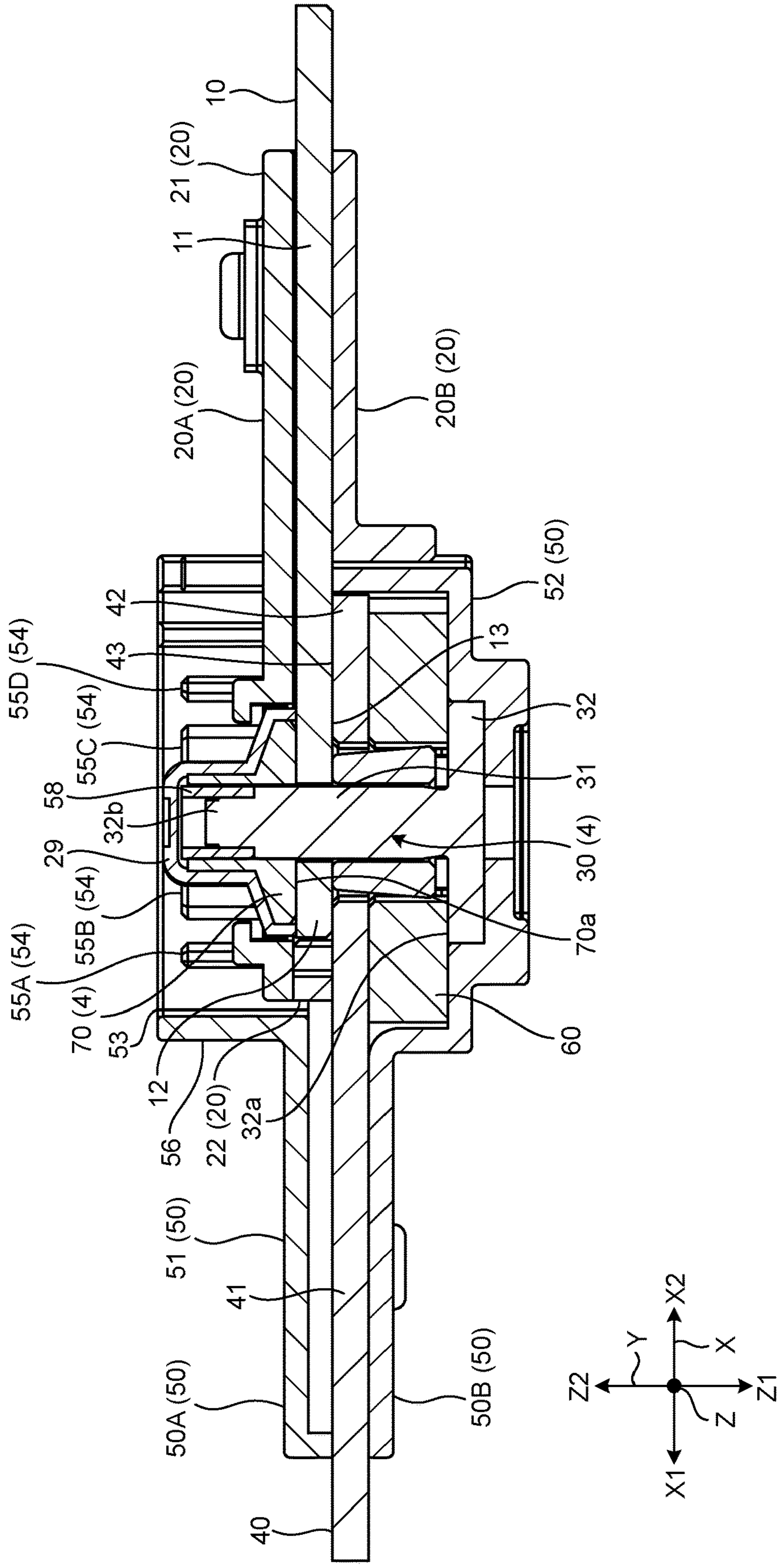
FIG. 10 is a cross-sectional view illustrating a schematic configuration of the connection structure of wiring materials according to the embodiment.

As illustrated in FIG. 10, in the first wiring material 2 and the second wiring material 3, the shaft part 31 of the fastening member 4 is inserted through the first through hole 14 for fastening and the second through hole 44 for fastening, and the second electric conductor 40 is fastened to the first electric conductor 10 by the fastening member 4. In the first wiring material 2 and the second wiring material 3, in the fastened state in which the first electric conductor 10 and the second electric conductor 40 are fastened by the bolt 30 and the nut 70 constituting the fastening member 4, the first finger touch prevention part 24 is inserted through the through hole 45 for the second finger touch prevention part, and the second finger touch prevention part 54 is inserted through the through hole 15 for the first finger touch prevention part. Due to this, in the first wiring material 2 as a single item and the second wiring material 3 as a single item, the height (length) in the plate thickness direction Z of the first finger touch prevention part 24 can be maintained at a height with which the finger of the operator cannot be brought into contact with the first connection surface 13. Furthermore, in a state in which the first wiring material 2 is connected to the second wiring material 3, when the first finger touch prevention part 24 is inserted through the through hole 45 for the second finger touch prevention part and the second finger touch prevention part 54 is inserted through the through hole 15 for the first finger touch prevention part, a distance in the plate thickness direction Z between the first connection surface 13 and the second connection surface 43 can be shortened, and the first connection surface 13 and the second connection surface 43 can be brought into direct contact with each other.

In the present embodiment, at the time of screwing the nut 70 to the bolt 30 to fasten the first electric conductor 10 and the second electric conductor 40, the collar 60 made of metal is added between a seat surface 70*a* of the nut 70 and the seat surface 32*a* of the head part 32 of the bolt 30. By interposing the collar 60 between the second connection part 42 and the seat surface 32*a* of the bolt 30 with respect to the fastening direction by the bolt 30 and the nut 70, the cylindrical part 25 made of resin can be prevented from buckling between the nut 70 and the head part 32 at the time of fastening.

As described above, in the connection structure 1 of the wiring materials according to the present embodiment, the first connection housing part 22 includes the first opening part 23 that exposes part of the first connection part 12 housed inside to the outside, and the first finger touch prevention part 24 that is positioned to be overlapped with at least the first opening part 23 and formed to prevent finger touch with the first connection part 12 housed inside. The second connection housing part 52 includes the second opening part 53 that exposes part of the second connection part 42 housed inside to the outside, and the second finger touch prevention part 54 that is positioned to be overlapped with at least the second opening part 53 and formed to prevent finger touch with the second connection part 42 housed inside.

With the configuration described above, for example, even in a state in which the first wiring material 2 and the second wiring material 3 are energized at the time when the operator connects the first wiring material 2 to the second wiring material 3, finger touch with the first connection part 12 and the second connection part 42 can be prevented by the first finger touch prevention part 24 and the second finger touch prevention part 54, so that safety of the operator can be secured.

In the connection structure 1 of the wiring materials according to the present embodiment, in the first wiring material 2 and the second wiring material 3, in the fastened state in which the shaft part 31 of the fastening member 4 is inserted through the first through hole 14 for fastening and the second through hole 44 for fastening, and the second electric conductor 40 is fastened to the first electric conductor 10 by the fastening member 4, the first finger touch prevention part 24 is inserted through the through hole 45 for the second finger touch prevention part, the second finger touch prevention part 54 is inserted through the through hole 15 for the first finger touch prevention part, and the first connection surface 13 and the second connection surface 43 are brought into contact with each other in the plate thickness direction Z to be electrically connected.

With the configuration described above, the first wiring material 2 and the second wiring material 3 can be electrically and physically connected to each other without using a current bridge interposed between the first connection part 12 and the second connection part 42 in the related art. As a result, for example, an increase in cost of a component corresponding to the current bridge can be suppressed.

As described above, with the connection structure 1 of the wiring materials according to the present embodiment, a proper energized state between the wiring materials can be secured while securing safety.

The connection structure 1 of the wiring materials according to the present embodiment further includes the collar 60 made of metal that is interposed between the second connection part 42 and the seat surface 32*a* disposed on the shaft part 31 of the fastening member 4 with respect to the fastening direction (plate thickness direction Z) by the fastening member 4, and abuts on the second connection part 42 and the seat surface 32*a*. Due to this, in the fastened state, the collar 60 made of metal that is disposed between the second connection part 42 and the seat surface 32*a* of the fastening member 4 can restrict a fastening amount by the fastening member 4, and prevent the cylindrical part 25 as part of the first finger touch prevention part 24 from buckling due to fastening.

In the connection structure 1 of the wiring materials according to the present embodiment, in the fastening member 4, the head part 32 of the bolt 30, and the end part 32*b* on the opposite side of the head part 32 of the shaft part 31 of the bolt 30 are covered by a resin member having an insulation property, that is, the bolt cap 58 herein. The nut 70 is covered by a resin member having an insulation property, that is, the nut cap 29 herein. Due to this, for example, even in a case in which the operator touches the fastening member at the time of performing maintenance work for a vehicle and the like around the wiring material in the energized state, an electric shock can be prevented.

In the embodiment described above, each of the first wiring material 2 and the second wiring material 3 is formed in a linear shape in the extending direction X, but the embodiment is not limited thereto. For example, each of the first wiring material 2 and the second wiring material 3 may be configured by a linear portion extending in the extending direction X, and one or more bending parts or curved parts.

In the embodiment described above, the first housing member 20 is constituted of the upper case 20A and the lower case 20B, but the embodiment is not limited thereto. The second housing member 50 is constituted of the upper case 50A and the lower case 50B, but the embodiment is not limited thereto.

In the embodiment described above, the collar 60 is assumed to be one independent component, but the embodiment is not limited thereto. For example, the collar 60 may be configured integrally with the head part 32 of the bolt 30, or may be configured integrally with the second connection part 42 of the second electric conductor 40. The head part 32 of the bolt 30 has a circular shape when viewed from the plate thickness direction Z, but the embodiment is not limited thereto. The shape thereof may be a polygonal shape. In this case, for example, when the head part 32 having a polygonal shape is fitted into a polygonal-shaped recessed part disposed on the lower case 50B, corotation of the nut 70 and the bolt 30 can be prevented.

With the connection structure of wiring materials according to the present embodiment, it is possible to obtain the effect that a proper energized state between the wiring materials can be secured while securing safety of an operator.

Although the invention has been described with respect to specific embodiments for a complete and clear disclosure, the appended claims are not to be thus limited but are to be construed as embodying all modifications and alternative constructions that may occur to one skilled in the art that fairly fall within the basic teaching herein set forth.

The invention claimed is:

1. A connection structure of wiring materials, the connection structure comprising:

- a first wiring material including a first electric conductor having electrical conductivity, and a first housing member having an insulation property and configured to house the first electric conductor inside;
- a second wiring material including a second electric conductor having electrical conductivity, and a second housing member having an insulation property and configured to house the second electric conductor inside; and
- a fastening member configured to fasten the first electric conductor and the second electric conductor to be electrically connected with each other, wherein
- the first electric conductor includes:
  - a first main body part formed in a belt shape; and
  - a first connection part formed at at least one end part in an extending direction of the first main body part,
- the second electric conductor includes:
  - a second main body part formed in a belt shape; and
  - a second connection part formed at at least one end part in an extending direction of the second main body part,
- the first housing member includes:
  - a first main body housing part configured to house the first main body part; and
  - a first connection housing part configured to be coupled to the first main body housing part and house the first connection part,
- the second housing member includes:
  - a second main body housing part configured to house the second main body part; and a second connection housing part configured to be coupled to the second main body housing part and house the second connection part, the first connection housing part includes:

a first opening part configured to expose part of the first connection part housed inside to the outside; and a first finger touch prevention part positioned to be overlapped with at least the first opening part, and formed to prevent finger touch with the first connection part housed inside, the second connection housing part includes:

a second opening part configured to expose part of the second connection part housed inside to the outside; and a second finger touch prevention part positioned to be overlapped with at least the second opening part, and formed to prevent finger touch with the second connection part housed inside, the first connection part includes:

a first connection surface that is exposed to the outside via the first opening part, and opposed to a connection surface of the second connection part in a plate thickness direction of the first electric conductor;

a first through hole for fastening passing through the first connection surface toward a back surface in the plate thickness direction, through which a shaft part of the fastening member is inserted; and a through hole for the first finger touch prevention part that is disposed at a position different from a position of the first through hole for fastening, and passes through the first connection surface toward a back surface in the plate thickness direction, the second connection part includes:

a second connection surface that is exposed to the outside via the second opening part, and opposed to the first connection surface in a plate thickness direction of the second electric conductor;

a second through hole for fastening passing through the second connection surface toward a back surface in the plate thickness direction, through which the shaft part of the fastening member is inserted; and a through hole for the second finger touch prevention part that is disposed at a position different from a position of the second through hole for fastening, and passes through the second connection surface toward a back surface in the plate thickness direction, and in the first wiring material and the second wiring material, in a fastened state in which the shaft part of the fastening member is inserted through the first through hole for fastening and the second through hole for fastening, and the second electric conductor is fastened to the first electric conductor by the fastening member, the first finger touch prevention part is inserted through the through hole for the second finger touch prevention part and the second finger touch prevention part is inserted through the through hole for the first finger touch prevention part, and the first connection surface and the second connection surface are brought into contact with each other in the plate thickness direction to be electrically connected.

2. The connection structure of the wiring materials according to claim 1, the connection structure further comprising:

a collar made of metal that is interposed between the second connection part and a seat surface disposed on the shaft part of the fastening member with respect to a fastening direction of the fastening member, and abuts on the second connection part and the seat surface, wherein the first finger touch prevention part includes a cylindrical part that is formed in a cylindrical shape, and positioned inside the through hole for the second finger touch prevention part, the shaft part of the fastening member being inserted on an inner peripheral side thereof in the fastened state, and the cylindrical part is positioned between the first connection part and the seat surface in the fastened state.

3. The connection structure of wiring materials according to claim 2, wherein the fastening member is constituted of a bolt and a nut, the bolt includes:

the shaft part to which the nut is screwed; and a head part that is formed at one end part in the fastening direction and includes the seat surface, and the head part, an end part of the shaft part on an opposite side of the head part, and the nut are covered by a resin member having an insulation property.

* * * * *